(12) United States Patent
Calhoun et al.

(10) Patent No.: US 6,192,835 B1
(45) Date of Patent: Feb. 27, 2001

(54) HANDS-FREE PET LEASH SYSTEM

(76) Inventors: Jill M. Calhoun; Barbara A. Russell, both of 2325 Mosswood Ct. 5, Salem, OR (US) 97306

( * ) Notice: Subject to any disclaimer, the term of this patent is extended or adjusted under 35 U.S.C. 154(b) by 0 days.

(21) Appl. No.: 09/303,090

(22) Filed: Apr. 29, 1999

(51) Int. Cl.⁷ ..................................................... A01K 27/00
(52) U.S. Cl. ............................................................. 119/792
(58) Field of Search .................................... 119/770, 792, 119/857, 795, 797, 784

(56) References Cited

U.S. PATENT DOCUMENTS

| | | | |
|---|---|---|---|
| D. 336,550 | 6/1993 | Bishop | D29/10 |
| D. 350,628 | 9/1994 | Williams | D30/153 |
| D. 354,158 | 1/1995 | Trudeau | D30/153 |
| D. 375,587 | 11/1996 | Maglich | D30/153 |
| D. 383,256 * | 9/1997 | Hampton | D30/153 |
| 2,275,983 | 3/1942 | Nadeau | 227/49 |
| 2,333,488 | 11/1943 | Parth . | |
| 2,861,547 | 11/1958 | Dale . | |
| 3,004,519 * | 10/1961 | Weissman | 119/857 |
| 3,295,501 | 1/1967 | Riley | 119/96 |
| 3,589,341 | 6/1971 | Krebs | 119/106 |
| 3,721,216 | 3/1973 | Lippe et al. | 119/106 |
| 3,752,127 | 8/1973 | Baker | 119/109 |
| 3,910,234 | 10/1975 | Henson | 119/111 |
| 4,384,548 | 5/1983 | Cohn | 119/109 |
| 4,424,040 | 1/1984 | Buchheister et al. | 434/253 |
| 4,584,967 | 4/1986 | Taplin | 119/109 |
| 4,601,161 | 7/1986 | Drellich | 54/46 |
| 4,638,764 | 1/1987 | Anderson | 119/96 |
| 4,667,624 | 5/1987 | Smith | 119/96 |
| 4,676,198 | 6/1987 | Murray | 119/26 |
| 4,759,311 | 7/1988 | Boyle | 119/96 |
| 4,765,279 | 8/1988 | Klickstein | 119/109 |
| 4,787,340 | 11/1988 | Kirtley | 119/106 |
| 4,788,941 * | 12/1988 | Villeneuve | 119/96 |
| 4,817,562 | 4/1989 | Giroux | 119/96 |
| 4,879,972 | 11/1989 | Crowe et al. | 119/109 |
| 4,934,362 | 6/1990 | Birchmire, III et al. | 119/96 |
| 4,945,861 | 8/1970 | de Koenig | 119/109 |
| 5,003,929 * | 4/1991 | Dean | 119/120 |
| 5,038,719 | 8/1991 | McDonough | 119/110 |
| 5,080,045 | 1/1992 | Reese et al. | 119/109 |
| 5,099,799 | 3/1992 | Giacobbe | 119/106 |
| 5,161,486 | 11/1992 | Brown | 119/109 |
| 5,317,989 | 6/1994 | Swanson | 119/792 |

(List continued on next page.)

OTHER PUBLICATIONS

Website: www.spiritdogs.com "Hands–free Leash Belt" 11/20/97.
Website:www.oregontrailgroup.com "Lucky Dog" 5/1297.
Website: www.edonnet.com "DogRunnerTM" 5/12/97.
Website: www.nji.com "EZ Walk" Date Unknown.
Website –http://www.cwci.com/bdl/ –Anderson 5/12/97.
Website –http:www.jandjdog.com/products/leashes/cnvr-tish.html 5/1297.

Primary Examiner—Michael J. Carone
Assistant Examiner—Son T. Nguyen
(74) Attorney, Agent, or Firm—Ken J. Pedersen; Barbara S. Pedersen

(57) ABSTRACT

Embodiments of a hands-free leash system are described, which include quick-connect/disconnect fasteners to attach a belt around a person's waist, the belt to a leash, and the leash to a collar adapter. The leash system also includes a second attachment point on the belt for attaching a second end of the leash to the belt, so that the leash may be stored on the belt when not in use on the pet, instead of dangling from the belt or from the user's hand. Preferably, both of the leash attachment points on the belt are assemblies that may slide independently along the length of the belt, preferably all the way around the belt, so that the pet may maneuver around the user without tangling or twisting of the leash system. The quick-connect/disconnect feature of the fasteners allows for quick handling and response to any emergency.

9 Claims, 4 Drawing Sheets

U.S. PATENT DOCUMENTS

| | | | |
|---|---|---|---|
| 5,443,037 | * 8/1995 | Saleme | 119/771 |
| 5,456,213 | * 10/1995 | Beauchamp | 119/793 |
| 5,462,019 | 10/1995 | Hong-Rong et al. | 119/795 |
| 5,517,949 | 5/1996 | Harris | 119/795 |
| 5,551,380 | 9/1996 | Hodgson | 119/175 |
| 5,718,189 | * 2/1998 | Blake | 119/770 |
| 5,749,325 | 5/1998 | Albanese | 119/792 |
| 5,806,466 | * 9/1998 | Pintor et al. | 119/770 |
| 5,806,467 | * 9/1998 | Arakawa | 119/771 |
| 5,842,444 | 12/1998 | Perrulli | 119/770 |

* cited by examiner

HANDS-FREE PET LEASH SYSTEM

BACKGROUND OF THE INVENTION

1. Field of the Invention

This invention relates generally to pet leash systems that are strapped around a user's waist, so that the system may be hands-free during walking, jogging, or running with the pet. More specifically, the invention relates to a waist-mounted leash system that is hands-free both when the pet is attached and when the pet is not attached to the leash.

2. Related Art

Many leash systems have been developed that are waist- or shoulder-mounted, for reducing the need for users to grasp the leash while walking, exercising, or patrolling with a dog on the leash. Such leash systems are illustrated by Williams (Des. Pat. No. 350,628), Parth (U.S. Pat. No. 2,333,488), Smith (a child restraint, U.S. Pat. No. 4,667,624), and Birchmire III et al. (U.S. Pat. No. 4,932,362), McDonough (U.S. Pat. No. 5,038,719), Perrulli (U.S. Pat. No. 5,842,444) and Blake (U.S. Pat. No. 5,718,1890).

Williams discloses a design for a dog leash and belt, having a quick-release buckle on the belt and a quick-release connection between the leash and the belt. The leash connection to the belt appears to be on one side of the belt in a permanent or semi-permanent position. The Williams leash has a latch-hook that hooks onto a D-ring of a dog collar, as does a conventional leash.

Parth discloses a leash harness for use with military or police dogs. The leash is connected by a swivel connector to an integral portion of a belt. The leash extends from the swivel connector, loops through the D-ring on a dog collar, and extends back to near the swivel connector again, for joining of the two ends of the leash near the belt. This system keeps the leash in a permanent position relative to the belt and requires that a portion of leash strap nearly as long as the leash itself must slip through the collar D-ring in order to attach the dog to the leash or to release the dog from the leash. Parth comments that, when the dog is released from the leash, that the leash free end may be tucked through the belt, that is, between the belt and the user's waist or chest, but no more accommodation than that is made for the free end of the leash.

Smith discloses a safety harness for children, which includes a belt, a harness to be worn by the child, and a connection strap between the two. The belt is equipped with many rings fixed to the belt in spaced, permanent positions. The many rings are for hooking many different harness connection straps onto the belt, for securing several children to the user, for example, one on each side of the user, one in front, and one in back. The Smith connection straps each have a snap-hook on each end, one for hooking onto the belt and one for hooking onto the child harness.

Birchmire III et al. discloses a quick-release animal collar and leash that includes conventional automobile seat-belt buckles. The Birchmire III system attaches a flat tab (a male seat-belt connector) to the dog collar or harness, by passing the collar or harness through a ring on the male connector. The male seat-belt connector receives a cooperating female end of the connector on a first end of a leash. The leash has a second seat-belt connector member (a male member) about midway along the leash length and has a hook on the second end of the leash. Thus, the leash may secure the animal to a seat-belt in a car or truck (by use of the seat-belt connectors), or may secure the animal to cord such as a clothesline (by use of the hook). Birchmire III discloses that the male seat-belt connector positioned midway along the leash length may be snapped into the cooperating conventional seat belt in the user's car, or into a cooperating female member on a loop that may be placed on the user's conventional pants or slacks belt. In the case of a loop on the user's conventional belt, the leash would be restrained from lateral movement along the belt by the pants/slacks belt-loops.

McDonough discloses a leash system in which one end of the leash hooks onto the dog collar D-ring, and the other end is permanently connected to a belt at a leash attachment point. The McDonough leash has a handle loop along the mid-section of the leash as well as a two rings along the mid-section. One of the two rings may be placed on a hook on the belt a fixed distance from the leash attachment point to shorten the leash while still attached to the dog and, hence, bring the dog up close to the user. The other of the two rings may be used for attachment of a second leash for a second dog.

Perrulli discloses a leash system with a belt that has an elongated slide member about half the length of the belt and secured at its ends to the belt. A ring may slide along the slide member and a leash may be hooked to the ring, so that the leash may slide about 180 degrees around the back of the user of the system.

Blake discloses a belt for wrapping around a user's waist and securement by a hook-andloop fastener. The belt has two fixed attachment rings sewn onto the belt. A loop may be pulled by the user to pull the belt off of his/her waist, so that the loop effectively becomes a leash and the rest of the belt dangles from the leash.

Still there is needed an effective hands-free leash system that is simple, safe, light-weight, and easy-to-use. There is a need for such a leash system that is not bulky, is not prone to entanglements, but is quick to use in all circumstances. There is a need for a leash system that may allow complete hands-free use for either the serious athlete or the occasional walker/jogger who wants a pet to accompany him/her either for companionship, motivation, pet exercise, and/or for safety. The invented leash system meets these needs.

SUMMARY OF THE INVENTION

The present invention is a hands-free leash system that allows hands-free use both when the animal is connected to the leash and when the animal is unleashed. The system comprises a waist belt, a leash, and a collar adapter/connector, which cooperate with each other to provide easy, quick-connection/disconnection of the dog from the leash, the leash from the belt, and the belt from the person wearing it. In addition, a second quick-connect/disconnect point is provided on the belt for quick-connecting the free end of the leash, once it is disconnected from the collar connector, to the belt. In this way, when the pet is freed from the leash, the leash may be secured in a simple, short loop hanging from the belt and the user's hands are not required for holding either end of the leash.

Preferably, each of the connections, between collar connector and leash, between leash and belt, between leash free end and belt, and between the two ends of the belt, utilizes a quick-release connector comprising a buckle connector (female portion) and a pronged connector (male portion). This way, the user may make all the desired connections and disconnections in a sure, simple, and quick manner. The pet may easily be attached and detached from the leash, without the need for positioning and manipulating a latch-hook or snap-hook and without the need to thread the dog collar through a ring or remove a long strap from the collar D-ring. The leash may be easily attached to the belt, or may be easily detached from the belt in case of an emergency or in case the user wishes to convert the leash for use as a conventional hand-held leash. The leash may be easily stored on the belt, out of the way of the user, yet readily available for re-attachment to the pet.

Preferably, both leash connectors on the belt feature independent sliding means so that one or preferably both of the connectors may slide at least half way around the circumference of the belt, and preferably 360 degrees around the belt. This sliding feature allows the leash to move around the perimeter of the waist, so that it can be worn at any spot around the waist. This sliding feature may accommodate the user's personal preference for placement of the pet or the pet's changing preference, for example, right-side, left-side, front, back, front. The user is, therefore, not constrained to one or two positions for the placement of the pet, and the pet has more freedom to move about the perimeter of the belt during the walk or run, thereby discouraging entanglements with the user. Also, when the un-used leash is connected at both ends to the belt, both the sliding leash connectors may be slid independently to opposing sides of the belt, so that the leash, in effect, is wrapped around his/her waist to further secure and lift the leash out of the way of user. This further assures that the user does not have to carry or handle the leash when it is not engaged to the pet, thereby meeting the aforementioned object of complete "hands-free" operation.

Optionally, the system may include means (not shown) for maintaining one or both sliding members in fixed positions relative to the belt, at the user's discretion. Such fixing means would allow the user to select and control the location of the pet relative to the user, based on personal preference, jogging path terrain, or for pet training. Means for fixing the positions could include such elements as hooks, ties, slots for receiving and anchoring the otherwise-sliding members, etc.

Preferably, both the belt and the leash are adjustable in length. In this way, the belt may be adjusted for variously-sized waists and clothing. The leash length may be adjusted for personal preference, and for transforming from a hands-free running leash to a shorter, hand-held leash when desired. Also, the leash may be shortened in length in preparation for hanging it from the two sliding leash connectors on the belt, so that the leash hangs a minimum distance from the belt.

DETAILED DESCRIPTION OF THE PREFERRED EMBODIMENT

Figure 1:
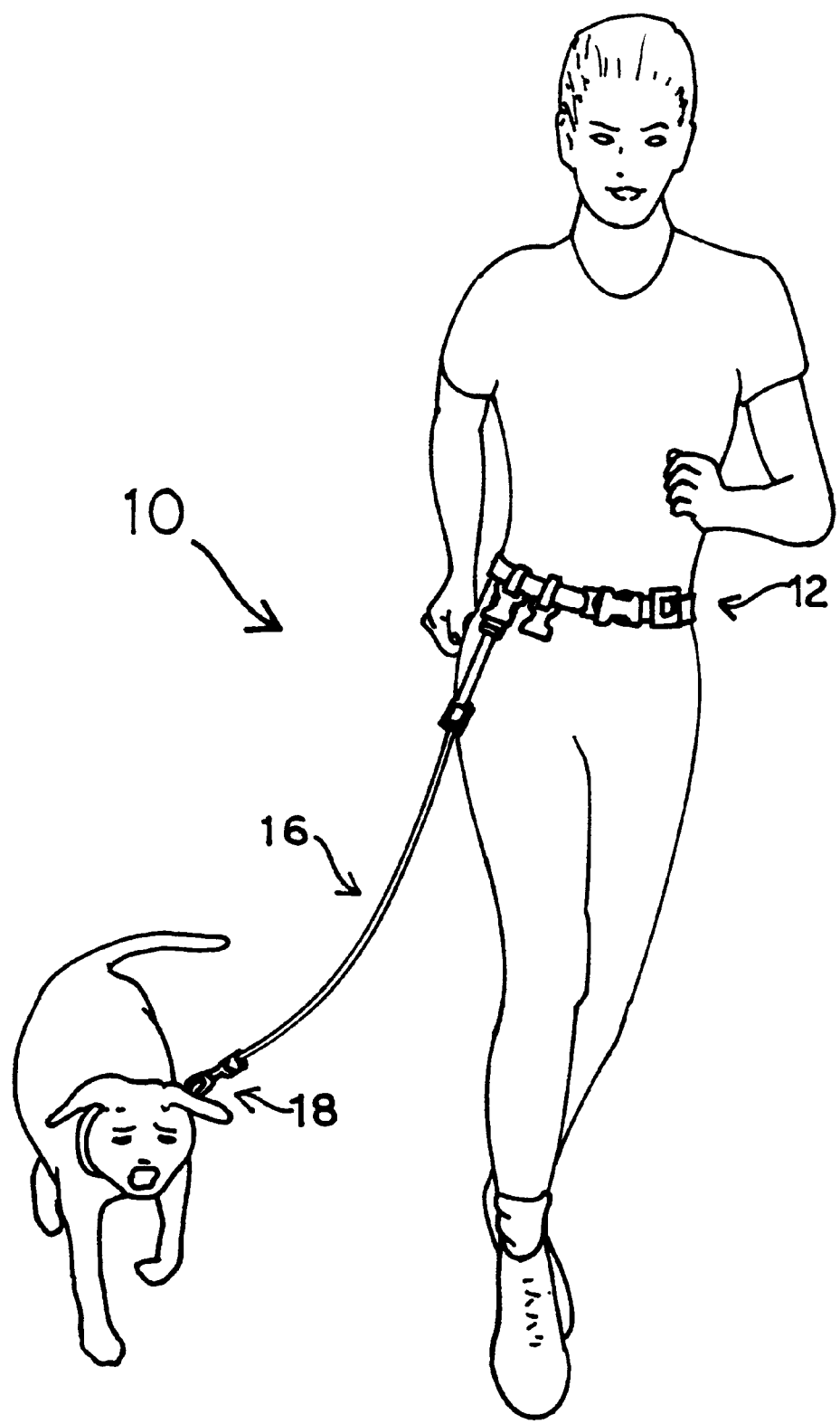
FIG. 1 is a perspective view of one embodiment of the invention in use on a dog during a pet-owner's run.
Figure 2:
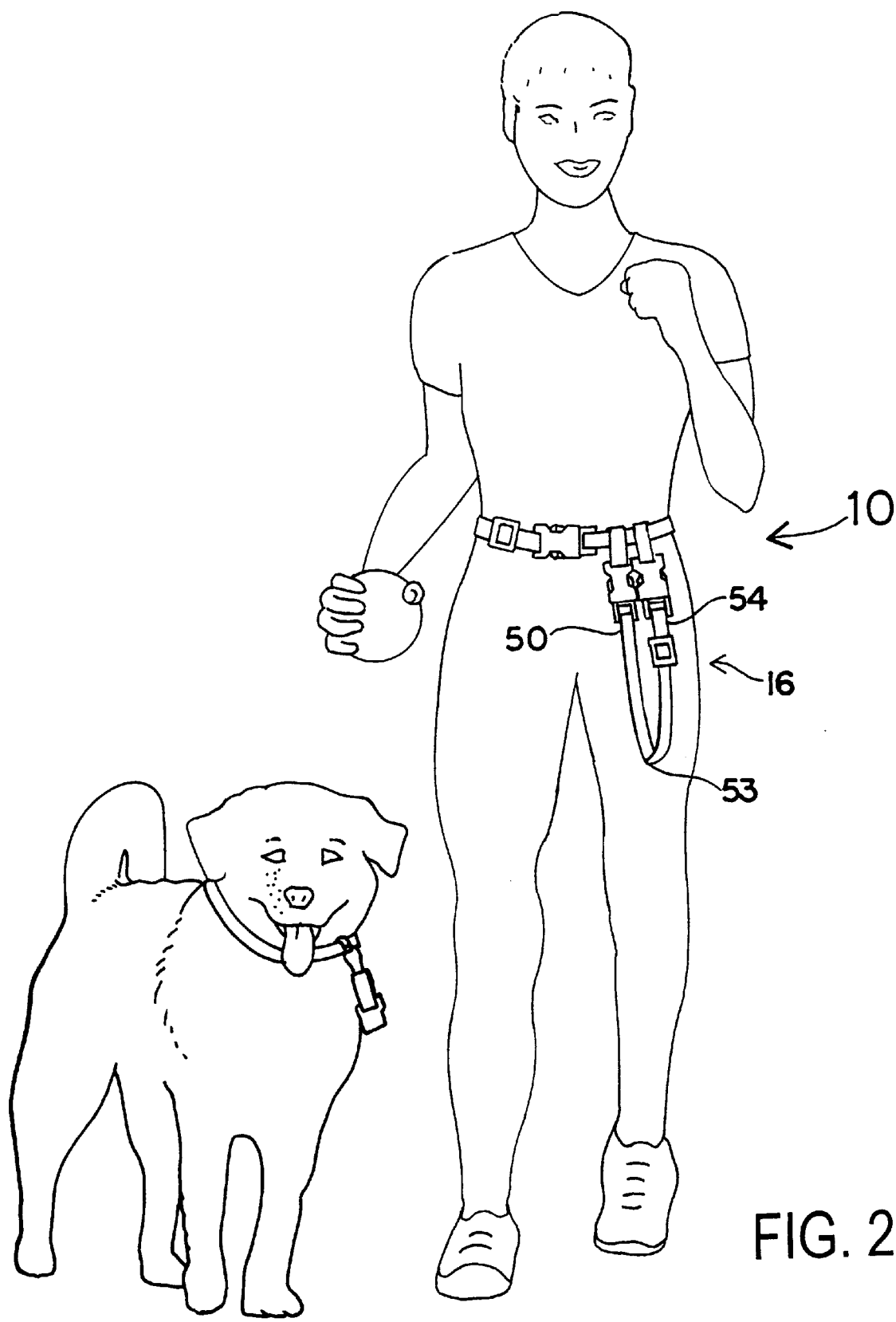
FIG. 2 is a perspective view of the embodiment of FIG. 1 on a user's waist, with leash detached from a dog shortened by sliding the sliding buckle near the distal end of the leash, and stored on the belt, so that both user and dog are free for play.

Referring to the Figures, there is shown one, but not the only, embodiment of the preferred hands-free leash system 10. The leash system 10 is shown in use by a runner accompanied by her pet in FIG. 1, and in use when the runner has disconnected the pet for rest, play or other free movement in FIG. 2. In either case, the belt 12 of the leash system is preferably buckled around the user waist at a comfortable tightness.

Figure 3:
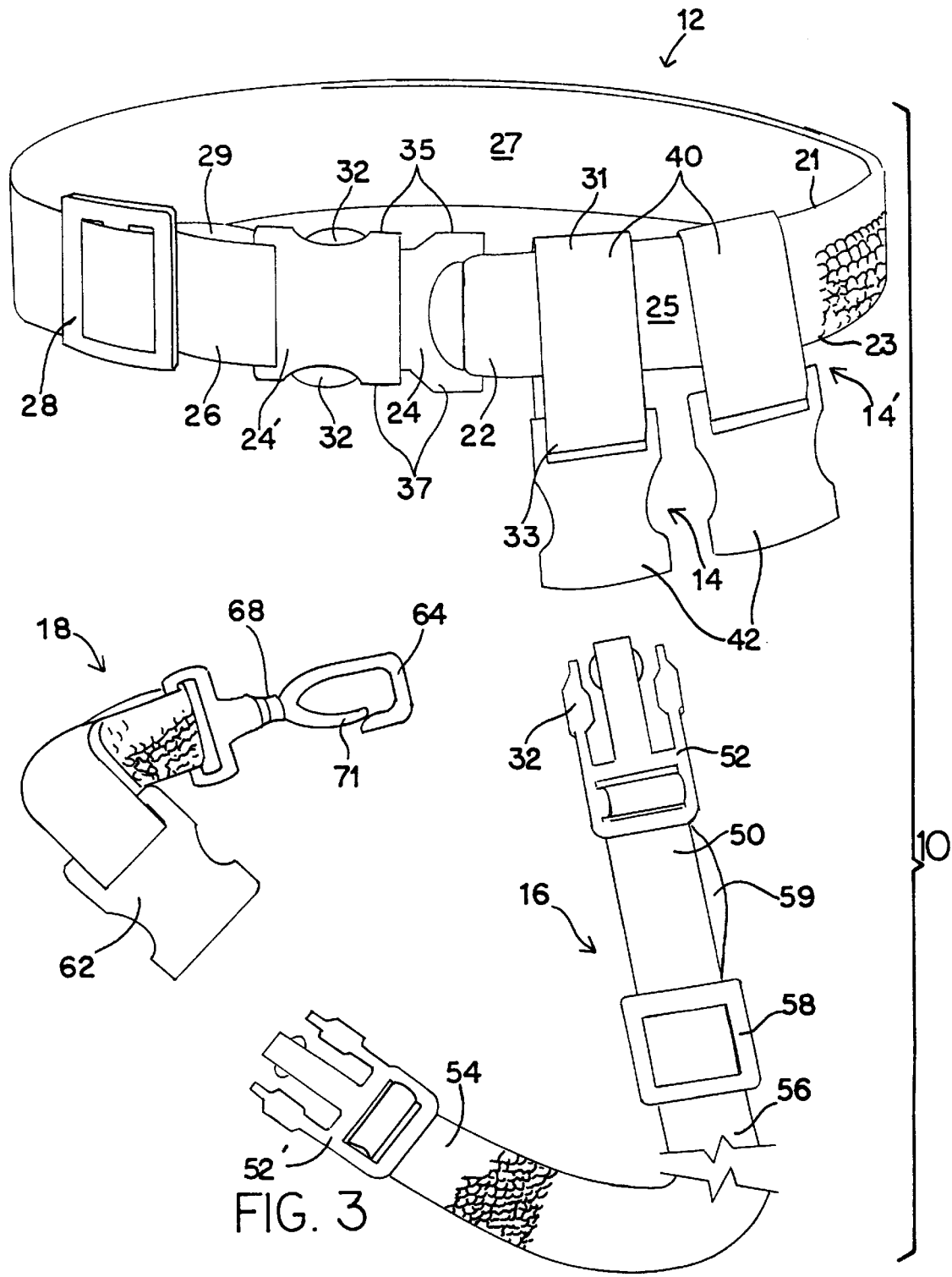
FIG. 3 is a front view of the embodiment of FIGS. 1 and 2, shown with the collar connector and leash disconnected from the belt.

The leash system 10 includes a belt 12, a leash 16, and an adapter or "collar connector 18" for attachment to a pet's collar, as shown to best advantage in FIG. 3. The belt 12 comprises a strap connected at one end 22 to a quick-release pronged member 24, and looped at its other end 26 through a cooperating buckle member 24' to form an adjustable loop secured by sliding buckle 28. The belt 12 has top edge 21, bottom edge 23, front surface 25, and back surface 27.

Quick-release connector members 24, 24', and the other quick-release connectors described below, are preferably of the type requiring modest pressure on both of the prongs 32 to flex the prongs 32 inward into the buckle member and allow the two members 24, 24' to separate. One of many types of quick-release connector that has been found to be appropriate is the Stealth™ quick-release buckle system, available from National Molding, of Farmingdale, N.Y. The connector members 24, 24' are shown with the adjustable loop 29 near the buckle member, but they may be reversed during manufacture as desired.

The belt 12, leash 16, and collar connector 18 may be made of various fabrics, plastics, cloth, or other flexible materials, but a preferred version uses woven nylon strap, as indicated schematically by the fabric weaving lines in FIG. 3. The preferred strap is nylon webbing, and is available from Wellington Synthetic Fibers, Inc., but other straps may be used. Strapping material of about one inch width is preferred, for a non-curling and comfortable belt.

The belt 12 preferably includes at least two slidable connector assemblies 14, 14', which are preferably, but not necessarily, identical in design. Each assembly 14, 14' comprises a strap loop 40 transversely encircling the belt, that is, each loop 40 extends around the width of the belt. Each loop 40 is preferably longer than the width of the strap of the belt and longer than the width of the buckle and prong members 24, 24', so that each strap loop 40 may easily slide around the circumference of the belt. Preferably the loops 40 may slide all the way around the belt, so that the connector assemblies 14, 14' may be positioned at any location around the user's waist. Because the belt 12 preferably lies on top all the user's clothing and is not threaded through any belt-loops or any other clothing, the loops 40 may slide around the entire belt, and even over the buckle top edge 35 and buckle bottom edge 37 of connectors 24, 24', while the belt is in place around the user's waist. Preferably, but not necessarily, the loops 40 are about 2–3 inches long, measured when the loops 40 are flattened against the belt. Alternatively, the slidable connector assemblies may be designed with sliding means other than loops that encircle the belt strap, for example, a fastener slidably mounted in a longitudinal slot in the belt, or mounted on an elongated cord parallel to the main belt strap.

Each loop 40 has a top end 31 and a bottom end 33. On the bottom end 33 of each loop is attached half of a quick-release connector (of same/similar construction as connector portions 24, 24'), which is preferably a (female) buckle member 42 for receiving a cooperating pronged member 52 on one end of the leash 16. As described later in this section, the buckle members 42 of the slidable connector assemblies also cooperate with the pronged member on the opposite end of the leash for storage of the leash. Preferably, but not necessarily, each buckle member 42 is about 1½ inch long, so that each connector assembly 14, 14' is a total of about 3½–4½ inches long and extends about 2–3 inches below the belt strap. In this way, the connector assemblies 14, 14' are easy to access but do not hang so far from the belt that they get in the way or become tangled. As illustrated in the Figures, each loop 40 has a length between its top end 31 and bottom end 33, and the length lies in a plane generally parallel to the front surface 25 of the belt 12, with the buckle member 42 hanging down from the bottom end 33 to also lie in a plane generally parallel to the front surface 25.

Leash 16 comprises a length of strap having quick-release connectors on each end. A first end (proximal end 50) of the strap is looped through quick-release pronged member 52 and is connected to the mid-section 56 of the strap by a sliding buckle 58 to form a loop 59 for adjusting the length of the leash 16. The second end (distal end 54) is attached, preferably by sewing, to another pronged member 52'. The inventors envision that the various pronged and buckle connector members may be switched in position, for example, to place buckle connectors on each end of the leash 16 and pronged members on the belt and the collar connector. However, the preferred configuration places the pronged connectors on the leash 16, and the buckle connectors on both the belt 12 and the collar connector 18, for aesthetics and to prevent the unlikely event of a pronged member on the pet collar or on the person's belt bruising or poking the pet or person.

Optionally, the leash system 10 may comprise more than two slidable connector assemblies, of the design of assemblies 14, 14' or other preferably slidable designs, for use with multiple leashes 16. In this way, a person having two or more pets may run or walk with the plurality of pets connected to leashes, and also may store all the leashes on pairs of sliding connector assemblies on the belt as described herein. The slidable feature of the connector assemblies is especially beneficial in such a plural-pet use, as a means for preventing/discouraging tangling of the pets around each other and/or around the user.

As discussed above, during use of the leash, the leash proximal end 50 is connected to the belt by snapping the pronged member 52 into one of the two connector assemblies 14, 14'. During non-use of the leash, the leash distal end 54 is also connected to the belt by attachment of pronged member 52' to the other of the two connector assemblies 14, 14'. This way, the leash 16 and its center 53 hangs out of the way, in a loop between the user's waist and knees and preferably close to the user's waist.

Alternatively, if the user wishes to leave the animal/child on the leash but wants to hold the leash in her/his hand, the user may quickly disconnect the leash from its slidable connector assembly (14, 14') and hold the leash in her/his hand. Although the leash is preferably reversible due to the two ends of the leash having identical connector members, the user typically chooses to have the end of the leash with adjustment loop 59 connected to the belt during use. This way, when the leash is disconnected from the belt but still connected to the animal, the user may adjust the leash loop 59 to an appropriate size for serving as a handle on the proximal end of the leash.

Figure 4:
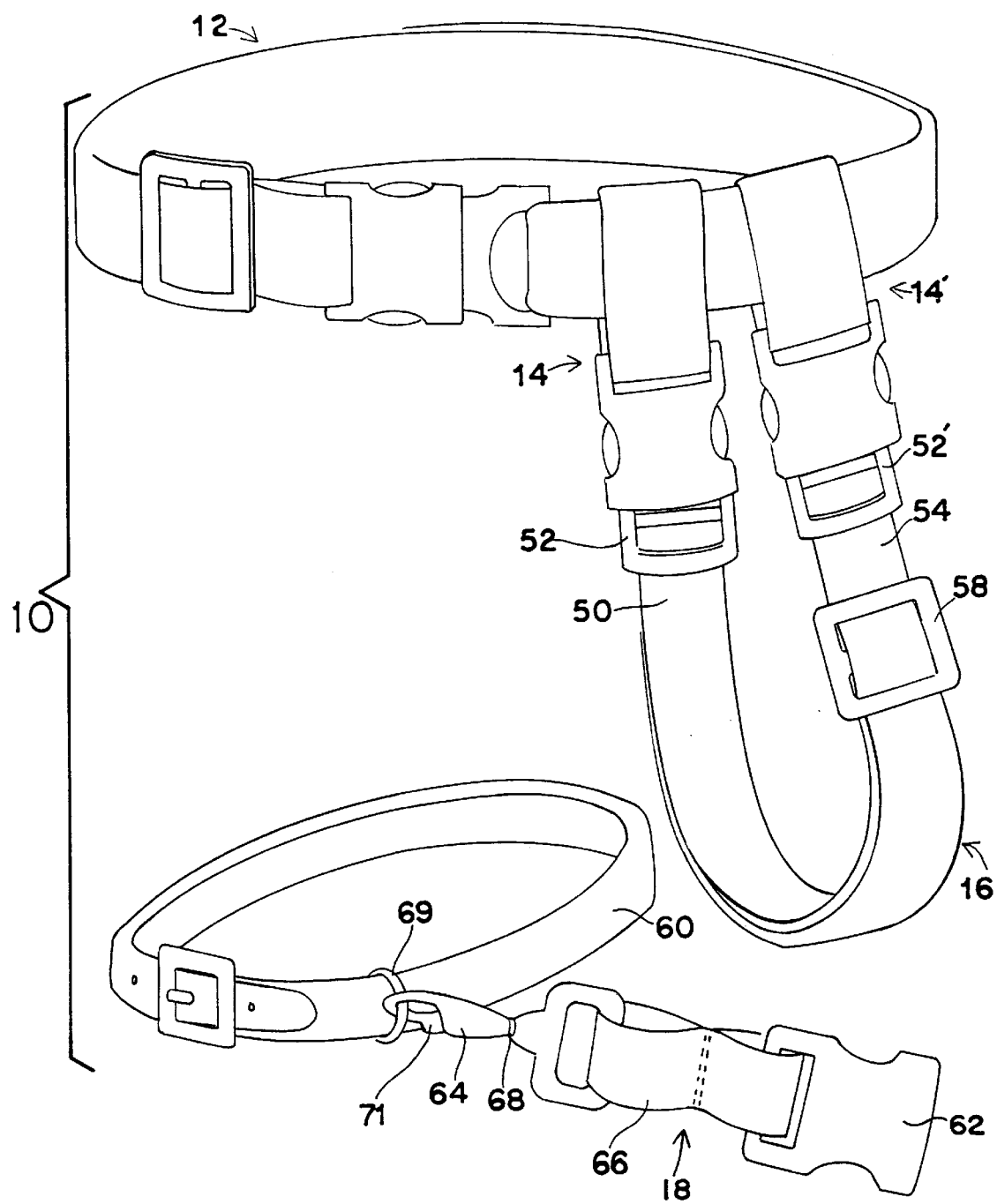
FIG. 4 is a front view of the embodiment of FIGS. 1–3, shown with the leash shortened by sliding the sliding buckle near the distal end of the leash and stored on the belt and the collar connector left in place on a dog collar.

The preferred adaptor for attaching the leash distal end 54 to the pet collar or harness is the collar connector 18, which may be installed on a conventional dog collar 60 as shown in FIG. 4. The collar connector 18 comprises a quick-release buckle member 62, on one end, connected to preferably a hook 64 on the other end. Various means may be used to connect the buckle member to the hook member, for example, the buckle member may be connected by various strap or tie members, or may be directly attached either by integral molding, welding, tacking, or other fastening. In the preferred collar connector 18, shown in FIGS. 2–4, the buckle member 62 and the hook 64 are connected by a sewn loop 66 of one-inch-wide strap. The hook 64 preferably, but not necessarily, is a swivel hook that includes a swivel 68 to prevent twisting and tangling of the leash due to the relative movement of user and pet and preferably includes a snapping member 71 that assists in keeping the hook 64 on the collar. The hook 64 easily snaps onto a D-ring 69 of a conventional collar 60 without modification of the collar and without having to remove the collar from the pet to slip loop or ring members onto the collar. The collar connector 18 is preferably only about 4½ inches long and, being made of preferably small plastic, metal, or other components, is very light-weight. Whether in use as a connection to the leash or hanging from the collar until the next use, the collar connector is comfortable for the animal because it is fairly short, lightweight, and has no sharp edges. In addition, the collar connector 18 is convenient for the user because it is a length and shape that is easy and comfortable to grasp when the user wishes to reconnect the animal/child to the leash.

In use, the user adjusts the belt to proper length for a comfortable fit around her/his waist and connects the leash to one of the connector assemblies 14, 14'. In most cases, the leash will have been adjusted before hand to about ½–¾ of its maximum length, depending on the user's preference. The connector assembly 14 is slid to the desired position on the belt, and the leash distal end 54 is snapped into the collar connector 18 which hangs from the pet's collar. Thus, while running or walking with the pet on the leash, the user enjoys the security and companionship of having the pet leashed and nearby, but also enjoys the comfort and safety of the pet and leash not becoming entangled or twisted. Because the strap material of the preferred belt and slidable connector assemblies is quite slick and smooth, the slidable connector assemblies tend to slide easily along the belt length. The pet therefore may maneuver to various locations around the user while the leash and slidable connector assemblies sliding to a comfortable position directly between the pet and the user. In the event of an emergency, the user may quickly release the leash from the belt, with one quick motion of unsnapping the pronged member from the assembly 14, 14', to separate the user and the animal. In the event that the user wants to unleash the animal for rest or walking, the user simply unsnaps the leash from the collar connector, again with a single quick motion, and the animal is freed. During the period when the animal is unleashed, the user can easily snap the distal end of the leash onto the second of the connector assemblies 14, 14' to hang the leash. In all circumstances, the invented leash system 10 is hands-free, except for the brief snapping and unsnapping of the connectors.

The leash system is simple, sleek, attractive, compact and lightweight. It need consist of no more than the belt with buckle means, two slidable connectors on the belt, a leash with connectors on both ends, and a cooperating adapter for attachment to an animal collar or a child harness. The belt need have no other loops, rings or other attachments points protruding from the longitudinal axis of the belt, except for the two slidable connectors. The quick-release connectors/ fasteners may be of various designs, but preferably are of designs that can be released with one hand. The preferred method of constructing the leash system 10 is sewing of the strap to/through the various connector members, but other methods such as gluing or heat-welding may be used.

Although the preferred use for the invented leash system 10 is for a runner/jogger who wants to train and exercise with his/her pet, the leash system 10 may have other uses. For example, the collar connector could be attached to a toddler's harness and the system 10 could be a simple, safe means for protecting a walking child in a public place, such as a shopping mall or a carnival.

Although this invention has been described above with reference to particular means, materials and embodiments, it is to be understood that the invention is not limited to these disclosed particulars, but extends instead to all equivalents within the scope of the following claims.

We claim:

1. A leash system comprising:
    a belt with a length, a top edge, and a bottom edge, and having two slidable connector assemblies loosely encircling the belt and freely sliding independently from each other along the length of the belt, wherein the two slidable connector assemblies slide 360 degrees around the belt, each slidable connector assembly having a top end and a bottom end, the bottom end hanging down below the bottom edge of the belt and comprising a quick-connector; and
    a leash having opposing first and second ends, wherein the leash is removably connected at the first end to the quick-connector of one of the slidable connector assemblies, wherein the leash is adapted at the second end to attach to the quick-connector of the other of the two slidable connector assemblies for storage, and wherein the leash is adapted to detach from the quick-connector of said other of the slidable connector assemblies for connection to a pet, wherein pulling on the leash by the pet slides the one connector assembly around the belt.

2. A leash system comprising:
    a belt for surrounding a user's waist, the belt having a length, a front surface, a back surface, a top edge, a bottom edge, and a width between the top edge and bottom edge, and the belt having two slidable connector assemblies that slide independently from each other along the length of the belt, each of said connector assemblies comprising:
        an elongated loop having a top end and a bottom end and a length between the top end and the bottom end, the loop extending transversely around the belt with the length of the loop parallel to the front surface of the belt, so that the top end is at the top edge of the belt and the bottom end is near the bottom edge of the belt; and
        a first connector portion attached to the bottom end of the loop and extending down from the loop parallel to the loop length and to the front surface of the belt;
            wherein the loop length is greater than the belt width and the loop loosely encircles the belt so that the loop slides easily along the length of the belt; and
    wherein the belt has a belt buckle for buckling the belt around the user's waist, the belt buckle having a buckle top edge and a buckle bottom edge and a buckle width between the buckle top edge and the buckle bottom edge, and wherein said loop width is greater than the belt buckle width so that the loop slides over the belt buckle and 360 degrees around the belt;
    the system further comprising:
        a leash attachable to the belt in a first position for storage and a second position for connection to a pet, the leash having a center and opposing first and second ends, wherein the first and second ends each have a second connector portion, wherein:
            when the leash is removably stored on the belt in the first position, the second connector portion of the leash first end is attached to the first connector portion of one of the two slidable connector assemblies, and the second connector portion of the leash second end is attached to the first connector portion the other of the two slidable connector assemblies, so that said first and second ends are secured near the belt and the center loops down below the belt between waist and knees of the user; and
        when the leash is attached to the belt in the second position, the first end is removably attached to one of the slidable connector assemblies and the second end is disconnected from the slidable connector assemblies, so that the leash extends from near the belt to a collar of a pet, wherein the loop loosely encircling the belt allows the pet to pull the leash along the length of the belt to move to various sides of the user.

3. A leash system as in claim 2, wherein the first connector portions are female buckles cooperating with said second connector portions.

4. A leash system as in claim 3, wherein the second connector portions are male buckles cooperating with the female buckles.

5. A leash system as in claim 2, wherein the first connector portions and second connector portions are quick-release buckles.

6. A leash system as in claim 2, further comprising a pet collar adapter having two ends, a snap-hook on one end for attachment to a pet collar D-ring, a female quick-release buckle on the other end for cooperation with the second end of the leash, and a loop of strap material connecting the hook and the female buckle.

7. A leash system as in claim 2, wherein the belt includes an adjustable loop held by a slidable buckle adapted for lengthening and shortening the belt.

8. A leash system as in claim 2, wherein the leash includes an adjustable loop held by a slidable buckle adapted for lengthening and shortening the leash.

9. A leash system as in claim 2, wherein the belt has opposing sides when surrounding the user's waist, and, when the leash is in the first position, the second connector portions on the leash first end and second end are attached to the two slidable connector assemblies, and the two slidable connector assemblies are slid apart to the two opposing sides of the belt to hang the leash in a loop close to the user's waist.

* * * * *